March 9, 1954     W. S. HERBERT     2,671,820
COMBINATION JUMPER INSULATOR
Filed May 18, 1951
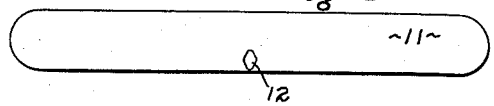
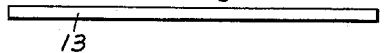
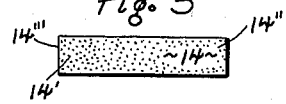
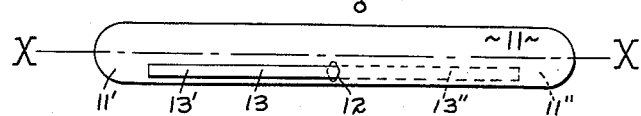
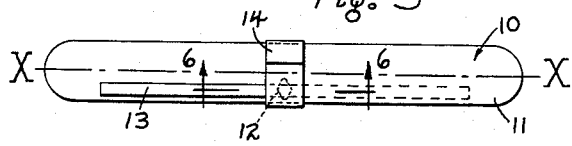
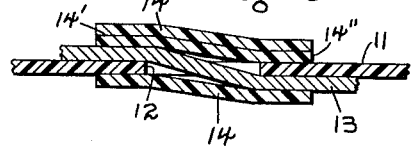
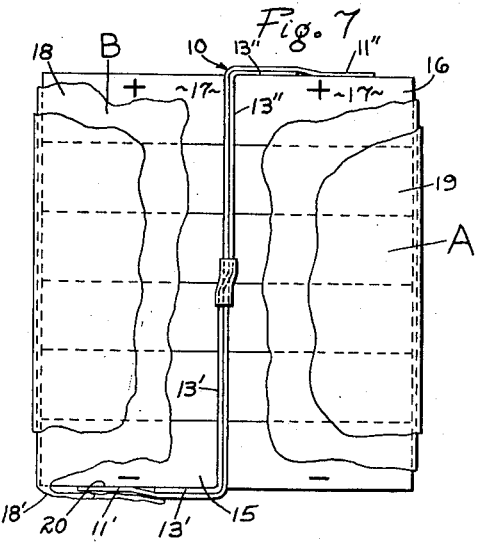
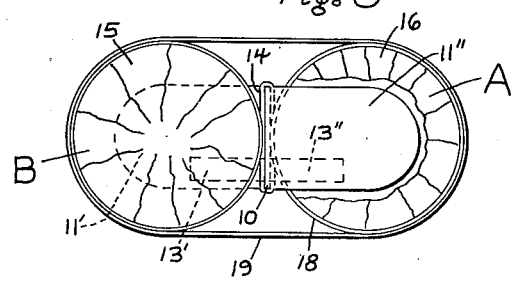
WILLIAM S. HERBERT
INVENTOR.
BY Beale and Jones
Attorneys Patented Mar. 9, 1954

2,671,820

UNITED STATES PATENT OFFICE 2,671,820

COMBINATION JUMPER INSULATOR

William S. Herbert, Madison, Wis., assignor to Ray-O-Vac Company, Madison, Wis., a corporation of Wisconsin Application May 18, 1951, Serial No. 227,080

18 Claims. (Cl. 136—173)

This invention relates to an improved multi-cell battery and more particularly to a novel combination jumper insulator for use in such multi-cell batteries. There have come on the market recently batteries formed from a plurality of relatively small individual cells. Such cells may be of the Lalande type employing an alkaline electrolyte and in some instances may be cells formed on the principles of the LeClanche cell which employ an electrolyte of zinc chloride and ammonium chloride. Such cells, while differing in construction and chemical constitution, have in general the characteristics of being relatively small and having cell diameters which considerably exceed the cell heighth. Moreover, in some instances, the end terminals of the individual cells take the form of metal caps, having generally flattened exterior end surfaces which are suitably insulated from each other.

While the present invention is not limited to use with cells of the Lalande type which employ an alkaline electrolyte, the advantages of the present invention are emphasized with relation to such cells wherein the prior art has always found it difficult to confine the alkaline electrolyte within the cell under all conditions of use and wherein the alkaline electrolyte is known to be highly corrosive. One form of cell with which the present invention may be used with great satisfaction is disclosed in applicant's co-pending application Ser. No. 729,684, filed February 20, 1947, now forfeited. As disclosed in that application, the positive cap is formed of metal which may be ordinary steel, the negative cap is preferably formed of tin plated steel and the two caps are crimped around the shoulders of a plastic insulating spool which may be formed of polystyrene, for example. In the construction shown therein the outer diameter of the insulating spool is appreciably less than the outer diameters of the metallic end caps. The end caps being symmetrical with respect to each other and having relatively flat exterior end surfaces provide individual cells which may readily be stacked in axial alignment.

It has further been found that relatively small, conveniently shaped batteries may be formed by utilizing, one, two, or more stacks of such individual cells so arranged and connected as to give any desired voltage or emperage required of the battery. An arrangement for assembling such stacks of individual cells into single or multi-cell stacked batteries is disclosed in applicant's co-pending application Ser. No. 103,257, filed July 6, 1949, now abandoned. As disclosed in said application, a plurality of the individual cells (also disclosed in the aforesaid application 729,684) may be assembled into batteries which include one or a plurality of individual stacks of super-imposed individual cells. For the purpose of insuring the proper alignment of the cells within each individual stack, for the additional purpose of insulating one stack from another adjacent stack of cells and for the further purpose of increasing the degree of cell-to-cell contact between the adjacent terminal caps of each pair of cells it has been found desirable to sheath each stack of cells in a suitable plastic sheathing. As taught in applicant's co-pending application Ser. No. 103,257, this plastic sheathing is preferably an adhesive backed plastic which may be regenerated cellulose of the type sold under the trade name "Scotch Tape" or may be a vinylidene chloride plastic of the type sold under the trade name "Saran" or may be a chlorinated rubber plastic of the type sold under the trade name "Pliofilm." In general any plastic having the desired qualities of being relatively flexible, capable of supporting an adhesive composition thereon, resistant to electrolyte fluids, and having satisfactory dielectric properties may be employed. In practice it is desirable to place the stack of axially aligned individual cells in a suitable jig and wrap around the peripheral edges of the stack of cells a strip of such sheathing material proportioned to surround the entire outer circumferences of the cells and to extend somewhat over the ends so as to permit folding over the ends with resultant axial compression of the stack of cells. Where two or more of such sheathed stacks of cells are placed side by side for assembly into a complete battery, it has been the practice in the past to provide a plurality of connectors and end terminals and to sheathe the several stacks of cells in an outer envelope or covering. Such outer envelope may be an additional sheathing of plastic or may be a metallic case.

While the batteries formed as described above have very distinct advantages in being adapted to occupy small spaces and have the further advantage of being capable of being formed into relatively oval batteries having flat sides, which, by elimination of bulk, permit their being used in small objects such as pocket radios and hearing aids, there are, nevertheless, certain disadvantages which the present invention overcomes. Where the individual cells are constructed in accordance with Herbert application Ser. No. 729,684, in exerting lateral compression from the sides of the individual stacks of the cells, where two or more stacks are placed in juxtaposition, there is some danger that the edges of the metallic end caps of the individual cells will abrade or cut through the inner plastic sheath which surrounds each stack. When this occurs, there is danger of shorting between cells in the different stacks and this increases the possibility that electrolyte may escape from within the underlying stack sheath to attack the outer envelope or casing and metallic connectors. This is particularly so where the electrolyte is sodium or potassium hydroxide.

The present invention therefore has for one of its objects the provision of a combination jumper insulator which is adapted to be placed between each pair of juxtaposed sheathed stacks of cells at the locus of their normal line of tangential physical contact. A further object of the invention is the use of the combination jumper insulator to carry a conductive ribbon so positioned as to be displaced from the locus of the normal line of tangential physical contact between the juxtaposed stacks of cells. A further object of the invention is the provision of a combination jumper insulator which may be prefabricated and installed as a unit in assembling a multistacked battery wherein the battery terminals may be disposed both at one end of the battery or on opposite ends of the battery and wherein the stacks of cells may be disposed in series connection or parallel connection. A still further object of my invention is to provide a combination inner insulator wherein all elements of the combination are flexible and wherein the connector element is permanently positioned during assembly in the desired relationship with respect to the insulator element.

The foregoing and other objects will be apparent from the accompanying drawings and the following specification.

Referring to the drawings in which like characters refer to similar parts,

Figure 1 is a top plan view of the elongated dielectric strip forming a part of the connector unit;

Figure 2 is a top plan view of the flexible electrical connector ribbon;

Figure 3 is a top plan view of the strip which is used to secure the elongated electrical connector ribbon in the aperture of the dielectric strip of Figure 1;

Figure 4 is a top plan view of the connector ribbon of Figure 2 associated with the strip of Figure 1 to form a connector unit;

Figure 5 is a top plan view of Figure 4 showing the securing strip of Figure 3 wound about the parts of Figure 4 to form the complete unit;

Figure 6 is an enlarged cross sectional view along line 6—6 of Figure 5;

Figure 7 is a side elevation of a pair of vertically disposed stacks of individual cells depicting the combination jumper insulator installed and electrically connecting in series the bottom cell of stack B with the top cell of an adjacent stack of cells A; and Figure 8 is a top plan view of the pair of stacks of cells in Figure 7 showing how the combination jumper insulator is held in place and the flexible electrical connector offset from the locus of the normal tangential line of physical contact of the cell stacks.

The combination jumper insulator according to this invention is indicated generally at 10 in Figure 5. It is made up of an elongated strip or sheet 11, as shown in Figure 1, of plastic material such as polystyrene or similar plastic insulating material which is reasonably flexible and has the desired dielectric properties and resistance to any electrolyte. Strip 11 is apertured as at 12, to accommodate an electrical conductive flexible ribbon 13 and a securing strip or tape 14 of adhesively coated plastic such as regenerated cellulose, chlorinated rubber or similar suitable material is wrapped transversely around. In the embodiment shown in Figure 5, the flexible ribbon conductor or flat strip 13 is disposed in the aperture 12 which is offset to one side in the strip 11 from the longitudinal axis X—X of the insulating strip.

In Figures 4, 5, and 7, it will be observed that in assembling the combination jumper insulator 10, the conductive ribbon 13 has one end portion 13' adjacent the aperture 12 which lies coextensive with, and along the adjacent face 11'; of strip 11, while the other end portion 13'' lies coextensive with, and along the adjacent face 11''', of strip 11. The ends of the ribbon 13 extend in spaced relation to the adjacent respective ends of the strip 11 of the connector unit.

In Figure 3 there is shown at 14' a coating of an adhesive which may be applied on the inner end face of strip 14 so that it is tightly held in place when wound around the assembled ribbon 13 and its supporting strip 11.

Reference to Figure 6 shows a fragmentary enlarged sectional view taken along lines 6—6 of Figure 5 depicting the passage of the flexible electrically conductive ribbon or connector 13 through the aperture 12 in strip 11. Wound around the assembly at the locus of the aperture 12 is the securing strip or tape 14 which shows at the top of the figure the overlapped ends 14'' and 14''' of the strip 14. It will be noted that the strip 14 is of such a width as to extend over each edge of the aperture 12 to securely hold the unit together and to insulate the conductive ribbon adjacent aperture 12.

Additional securing strips like 14, not shown, may be used if desired towards the ends of the unit but in spaced relation thereto to secure the flexible ribbon 13 against the adjacent faces of the strip 11.

In Figure 7 I have shown my combination jumper insulator installed so as to electrically connect the bottom terminal of the bottom cell 15 in stack B with the top terminal of top cell 16 in stack A which have been indicated on the drawing respectively as negative and positive terminals. Each of the stacks A and B is illustrated as made up of individual flat cells 17, shown merely diagrammatically, it being understood that the individual stacks are encased by a sheath 18 as fully described in co-pending application 103,257.

In installing the combination jumper insulator 10 so as to connect the pair of adjacently disposed cylindrical cell stacks B and A in a battery, the unit 10 is placed with the longitudinal axis X—X at the locus of the normal tangential line of physical contact of the two sheathed stacks of cells, as best shown in Figure 8, so that the connecter strip 13 is disposed at one side of the line of tangential physical contact, yet it is close to the diverging arcuate surfaces of the adjacent cell stacks A and B, yet remote from any outer envelope or case 19. The two cell stacks A and B are then assembled and held together, for example, by an outer envelope or casing 19 so that the strip 11 carrying ribbon electrical connector 13 is held tightly between the two cell stacks at the line of tangential physical contact, however, there is no appreciable spacing of the cells and a compact battery assembly is provided. I have shown a pair of cell stacks A and B by way of example, but it is understood that three or more cell stacks could likewise be assembled and provided with like connector units 10 whereby the bottom terminal of one cell stack is connected to the top terminal of an adjacent cell stack. In the particular illustration shown in Figures 7 and 8 of the battery, the cell stacks are connected in series, but it will be understood that stacks A and B could be assembled in parallel by reversing the polarity of stack A while leaving stack B as shown.

In the battery assembly shown in Figures 7 and 8 the ends of the unit 10 are bent in opposite directions onto the adjacent bottom and top terminals of the stacks A and B. The ends of the connector strip 13 are secured to the terminals as best illustrated in Figure 7. The terminal end 13″ of ribbon 13′ is bent over the negative bottom terminal of cell 15 and the projecting portion or end 11″ of strip 11′ is also bent over. The extra material of sheath 18 is bent over at 18′ where the adhesive on the inner face of sheath 18 will adhere to strip 11 (as well as to the bottom terminal surface of the bottom cell in stack B indicated at 20) whereby the end 13′ of flexible conductor 13 is held in electrical contact with the adjacent bottom negative terminal of the cell stack B. In like manner the other end of connector unit 10 is secured to the top terminal end of cell stack A.

It will be observed that the announced objects of this invention have been accomplished by the combination insulator jumper described, by way of illustration, above. The unit may be quickly and simply prefabricated, thus lending itself to mass production methods. The conductor ribbon which may be of any suitable metal or strip of conductive material is positioned by means of the offset aperture in the insulating strip and after being positioned may be held in place by the adhesive-backed plastic wrapping which, in addition to providing an insulating cover, also serves to fix the conductive ribbon against longitudinal slippage. The combination jumper insulator may be made as long or as short as desired or as wide or as narrow as desired for use with individual cells of varying cell diameters and for use in batteries formed of stacks of cells which may be few or many per stack.

After prefabrication of the combination jumper insulator, it will be found that its application in the assembly of the battery also lends itself readily to mass production. All elements of the combination being flexible, the conductive ribbon at both ends may be placed in contact with the desired end cells of the several stacks. When so placed in conductive relationship, the conductive ribbon is overlaid and insulated by the corresponding ends of the plastic strip and where the stacks of cells are sheathed with adhesive-backed plastic the excess sheath material at the end of the stack may be folded over and caused to adhere to the end terminal of the end cell as well as to the adjacent end of the insulating strip. This further insures the fixed positioning of the conductive ribbon and the resultant physical and electrical contact between the conductive ribbon and the end terminal of the adjacent cell.

A further advantage flows out of this arrangement in that the positioning of the combination jumper insulator is rendered permanent in the assembly of the several stacks or cells in the battery. When the two or more stacks of individual cells have been connected by means of the combination jumper insulator, and the two stacks are placed in juxtaposed parallel relationship, the insulating strip lies between the two stacks of cells at the locus of the line of tangential physical contact. When the several stacks of cells are encased in the outer covering or envelope the insulating strip of this invention serves to protect the interior individual stack sheaths at this locus thus preventing the cutting through of the sheath material by the metallic caps of the cells. It further insulates the cells of one stack from the cells in the other stack even if such cutting should occur. From another point of view the insulating strip is wedged in place between the adjacent stacks of individual cells and is thus permanently positioned therebetween. When so wedged and positioned, the insulating strip serves to hold the conductive ribbon away from the locus of tangential physical contact between the several stacks of cells but additionally maintains the conductive ribbon close between the peripheries of the cells in each stack and away from any outer sheath or covering. Thus, where the outer sheath or covering of the battery is metallic the danger of short circuit by contact between the conductive ribbon and the metal case is eliminated. A still further advantage flows out of the use of the combination jumper insulator of this invention. By making the plastic insulating strip wide enough it can be used to cover, particularly where several stacks of cells are arranged in series, that end cell terminal of the stack upon which it is not desired to place a battery terminal. The combination jumper insulator thus may eliminate the use of individual insulating discs which are customarily placed on certain of the stack ends.

It should be understood that while, in the illustrative embodiment described above, the insulating strip, or dielectric, 11 has been characterized as polystyrene, or similar plastic material, other forms of dielectric material may be employed. Polystyrene, and its plastic equivalents, will be preferred for use in most forms of Lalande type cells, employing an alkaline electrolyte. However, even in batteries formed of some forms of Lalande type cells, and most forms of LeClanche type cells, it will be possible to form the insulating strip 11 from insulating paper or thin insulating board possessing the desired dielectric properties, flexibility and resistance to the electrolyte employed. In other words it is not essential that the insulating strip 11 be formed of plastic although that form is preferred for batteries formed of alkaline dry cells.

I claim:

1. In a dry cell battery comprising an outer casing enveloping a plurality of cylindrical stacks of superimposed flat dry cells, said stacks being disposed side by side in substantially tangential physical contact, each of said stacks of cells being enclosed in an insulating sheath, the individual cells in each stack being in cell-to-cell contact, the improvement which comprises a combination jumper insulator positioned within said outer casing said combination jumper insulator comprising an elongated strip of flexible insulating material having one end bent over to cover at least part of the bottom terminal of the bottom cell in one stack and the other end bent over to cover at least part of the top terminal of the top cell in the adjacent stack, said strip being wedged between said two stacks of cells along the line of tangential physical contact therebetween, a conductive ribbon supported by said insulating strip, one end of said conductive ribbon being positioned under one end of said insulating strip and being in physical and electrical contact with said bottom terminal of said bottom cell, the other end of said ribbon being positioned under the other end of said insulating strip and being in physical and electrical contact with said top terminal of said top cell, a medial portion of said ribbon passing through an aperture in said insulating strip, said aperture being disposed to one side of the line of wedging of said strip whereby said ribbon is maintained in a position which does not coincide with the line of tangential physical contact between said stacks of cells.

2. The improvement defined in claim 1 wherein an adhesive-backed, insulating, plastic strip is wrapped around said insulating strip and said ribbon at a position coinciding with said aperture in said insulating strip whereby said ribbon is restrained against longitudinal displacement.

3. The improvement defined in claim 1 wherein said insulating strip is formed of flexible, dielectric plastic.

4. The improvement defined in claim 1 wherein said insulating strip is formed of polystyrene.

5. The improvement defined in claim 1 wherein said insulating strip is formed of flexible, dielectric paper.

6. The improvement defined in claim 1 wherein said strip is of such width and length that each end thereof covers and insulates the entire surface of the end terminal of the end dry cell against which it is disposed.

7. The improvement defined in claim 1 wherein the ends of the conductive ribbon of said combination jumper insulator establish electrical contact between the negative cell terminal of one stack of cells and the positive cell terminal of the adjacent stack of cells whereby the said two stacks are connected in series.

8. The improvement defined in claim 1 wherein the ends of the conductive ribbon of said combination jumper insulator establish electrical contact between the end cell terminal of one stack of cells and the opposite end terminal of the adjacent stack of cells, wherein said end terminals are of the same polarity, whereby the said two stacks of cells are connected in parallel.

9. A combination jumper insulator, adapted for use in multi-cell dry cell batteries composed of relatively flat dry cells and wherein the individual cells are arranged in a plurality of physically parallel juxtaposed stacks, each individual stack of cells being enclosed in a sheath of insulating plastic material, comprising an elongated strip of flexible, insulating material, an aperture in said strip intermediate the ends thereof, said aperture providing a passage through the strip extending at least a portion of the distance between the line of wedging of said strip between adjacent juxtaposed stacks of cells and one of the lateral edges thereof, an elongated conductive element having its major lateral dimension less than the size of said aperture and having a medial portion of said element passing through said aperture, the remaining portions of said element being positioned against, and parallel to, the respective contiguous surfaces of said insulating strip for at least a major portion of each end portion thereof, and securing means positioning the conductive element with respect to the strip of insulating material.

10. The combination defined in claim 9 wherein said insulating strip is formed of dielectric, plastic material.

11. The combination defined in claim 9 wherein said insulating strip is polystyrene.

12. The combination defined in claim 9 wherein said insulating strip is insulating paper.

13. The combination defined in claim 9 wherein said conductive element is metallic ribbon.

14. A combination jumper insulator, adapted for use in multi-cell dry cell batteries composed of relatively flat dry cells and wherein the individual cells are arranged in a plurality of physically parallel juxtaposed stacks, comprising an elongated strip of flexible, insulating material, an aperture in said strip intermediate the ends thereof, said aperture being disposed between the line of wedging of said strip between adjacent juxtaposed stacks of cells and one end of the lateral edges thereof, an elongated conductive ribbon element having its major lateral dimension less than the size of said aperture, and having a medial portion of said ribbon element passing through said aperture, the remaining portions of said element being positioned against, and parallel to, the respective contiguous surfaces of said insulating strip for at least a major portion of each end portion thereof, a second strip composed of adhesive-backed plastic sheeting being wrapped laterally around said first strip and covering said aperture and the portions of said conductive element at and adjacent said aperture thereby simultaneously insulating said ribbon adjacent said aperture and restraining said ribbon against longitudinal displacement with respect to said first strip.

15. The combination defined in claim 14 wherein said insulating strips are of plastic from the group consisting of polystyrene, regenerated cellulose, chlorinated rubber and vinylidene chloride.

16. A combination jumper insulator, adapted for use in multi-cell dry cell batteries wherein the individual cells are arranged in physically parallel relationship and in physcial contact along a tangential line, comprising a strip of flexible insulating material adapted to be wedged between two adjacent cells at their tangential line of contact, an aperture in said strip disposed in its entirety between the line of wedging of said strip and a lateral edge of said strip, and a second strip of conductive material, narrower than said first strip, said second strip passing through said aperture at an intermediate portion of said second strip, the remaining portions of said second strip being adapted to lie against, and parallel to, the respective contiguous surfaces of said first strip.

17. An article of manufacture comprising a relatively elongated strip of flexible dielectric material having an aperture therethrough, said aperture being disposed intermediate the ends of said strip and extending laterally of said strip at least a portion of the distance between one side edge and the major longitudinal axis of said strip, an elongated element of flexible conductive material disposed physically parallel to said dielectric strip for a major portion of the length thereof, and being disposed between the said major longitudinal axis and the said one side edge thereof, said conductive element passing through said aperture whereby one end portion of said conductive element is disposed against one face of said dielectric strip and the other end of said element is disposed against the other face of said strip, and securing means positioning the conductive element with respect to the strip of insulating material.

18. An article of manufacture comprising a relatively elongated strip of flexible dielectric material having an aperture therethrough, said aperture being disposed intermediate the ends of said strip and extending laterally of said strip at least a portion of the distance between one side edge and the major longitudinal axis of said strip, an elongated element of flexible conductive material disposed physically parallel to said dielectric strip for a major portion of the length thereof, and being disposed between the said major longitudinal axis and the said one side edge thereof, said conductive element passing through said aperture whereby one end portion of said conductive element is disposed against one face of said dielectric strip and the other end of said element is disposed against the other face of said strip, and dielectric means for covering said aperture and restraining said conductive element against longitudinal displacement with respect to said strip.

WILLIAM S. HERBERT.

References Cited in the file of this patent

UNITED STATES PATENTS

| Number | Name | Date |
| --- | --- | --- |
| 1,075,556 | Fenoughty | Oct. 14, 1913 |
| 1,900,906 | Brown | Mar. 14, 1933 |
| 2,405,034 | Harford | July 30, 1946 |
| 2,475,152 | Rock | July 5, 1949 |

FOREIGN PATENTS

| Number | Country | Date |
| --- | --- | --- |
| 187,722 | Great Britain | Oct. 26, 1922 |
| 372,937 | Germany | Apr. 5, 1923 |
| 346,862 | Great Britain | Apr. 23, 1931 |
| 876,242 | France | Oct. 30, 1942 |